March 31, 1942.    W. G. HOELSCHER    2,278,263
SPEED INDICATOR MEANS
Filed Nov. 25, 1940
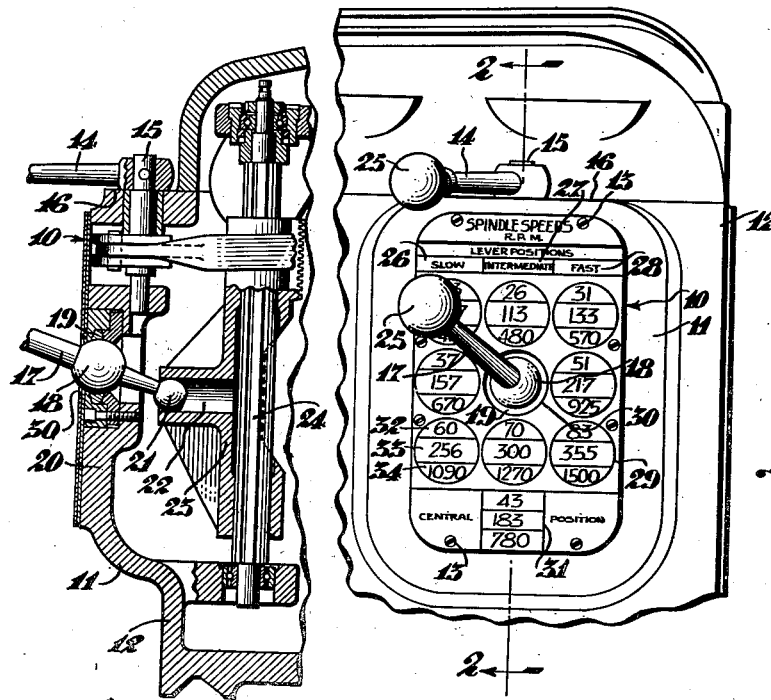
Fig. 1
Fig. 2
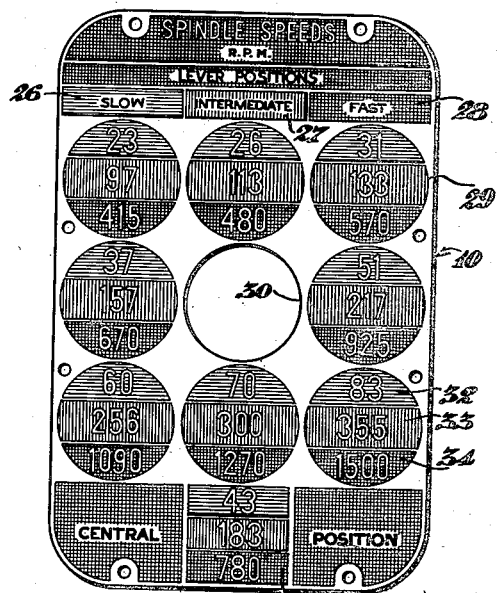
Fig. 3
INVENTOR.
William G. Hoelscher
BY
Wood & Wood ATTORNEYS Patented Mar. 31, 1942

2,278,263

UNITED STATES PATENT OFFICE 2,278,263

SPEED INDICATOR MEANS

William G. Hoelscher, Cincinnati, Ohio, assignor to The American Tool Works, Cincinnati, Ohio, a corporation of Ohio Application November 25, 1940, Serial No. 367,154

7 Claims. (Cl. 116—124)

This invention relates to indicator means. It is particularly directed to a speed indicator plate for use in conjunction with the shifting levers of a speed change mechanism.

In certain types of transmissions, such as those in the headstock of a lathe, a great many speed changes are necessary. It is also essential that the operator be able to read the indicator quickly. In the past, a great many indicator means have been provided, but they have not been compact and have not lent themselves to glance reading. Problems of compact indication arise particularly where the shifting is done mechanically. The present invention has particular application to a mechanical type shift, but is not limited to such use. In many instances, it is necessary to use a plurality of shifting levers; that is, one lever which shifts the mechanism into ranges, and another lever which shifts the mechanism into speeds within the respective ranges. The problem of keeping the indicator plate down to small dimensions and localizing the area in which the reading takes place where a great many speeds are employed has been a difficult one.

It has been the object of the present inventor to provide an indicator plate capable of indicating a great many speeds without the necessity for calculation and within a small area about the levers.

More particularly, it has been the object of the present inventor to provide an indicator plate disposed relative to two levers, one of which indicates the ranges and the other of which indicates the speeds within the ranges. More particularly, it has been the object to provide an indicator plate utilizing colors for determining the speed by the relationship of the manipulating end of the levers relative to colored panels.

A series of colored panels, for example, blue, red, and black may be utilized for indicating slow, intermediate, and fast speed ranges generally. Adjacent these indicating panels and on the same plate, a plurality of speed indicating panels may be provided, relative to which the speed control lever is set. Each one of these includes a speed within each of the ranges, using the same color scheme. That is to say, each speed indicator panel includes blue, red, and black areas, each having a speed marking. All the operator has to do is to note the position of the range control lever relative to a range panel and he will know that the speed to which the speed control lever has been set is that speed on the speed panels having a color corresponding to the color indicated by the range control lever.

It has been the still further object of the present inventor to provide an arrangement and relationship of the speed control lever and the panels whereby the manipulating end of the lever can be disposed in front of the panel indicating the speed to which the mechanism has been set and to place these panels around the fulcrum or pivotal point of the lever so that the lever may be moved universally; that is, either horizontally or vertically to swing the manipulating knob in front of one of the panels. Thus, it is possible to indicate a wide range of speeds immediately about the pivotal point of a speed control lever.

The shifting means moved by the respective levers forms the subject matter of another application Serial No. 366,893, filed November 23, 1940. The present application is directed solely to the indicator plate and the relationship of the levers to it.

Other objects and certain advantages will be more fully apparent from the following description of the drawing in which:

Figure 1 is a fragmentary front view of a portion of a lathe headstock, illustrating an indicator plate and lever arrangement of this invention generally.

Figure 2 is a sectional view taken on line 2—2, Figure 1, showing generally the mounting of the levers relative to the indicator plate.

Figure 3 is a detail front view of the indicator plate showing the arrangement of the panels and color scheme.

Referring to the drawing, the indicator plate 10 is fixed to the front face of a bulge portion 11 of the headstock 12 by means of screws 13. A range shifting lever 14 is fixed on the upper end of a vertical shaft 15. The lever projects horizontally and rests on the top surface 16 of the bulge. The shaft 15 is mounted in the bulge and includes a connection to gear shifting mechanism (not shown).

The speed shifting lever 17 includes a ball portion 18 intermediate its length, mounted in socket elements 19, secured in the forward wall 20 of the bulge portion. The inner end of the lever 17 includes a ball portion 21 engaged in a horizontal bore 22 of a rotatable and axially movable shifting element 23 in splined connection on a shaft 24. This lever and shifting element are effective for operating gear shifting mechanisms either by movement of the lever in horizontal plane for rotating the shaft, or by movement of the lever in vertical plane for moving the shifting element axially.

The gear shifting mechanisms actuated are not illustrated as they do not form a part of this invention and are fully disclosed in the copending application above identified. The outer ends of the respective levers provide manipulating knobs 25.

Just below the horizontally movable lever 25 are indicated the several positions for the range control lever 25, as slow, intermediate, and fast. The panels including these range indications are indicated at 26, 27, and 28 respectively and are colored blue, red, and black (see the detailed disclosure in Figure 3). Thus, the operator may speedily learn that the color blue indicates the low speed range, the color red, the intermediate speed range, and the color black, the fast range.

There are three rows of speed indication panels, circular in form, as indicated at 29. More specifically, there are three rows, both horizontally and vertically. Inasmuch as the central panel; that is, the one at the point of mounting of the lever, is cut away as at 30 for the purpose of clearing the lever, this panel is transferred below as at 31, centrally of the lower area of the plate.

Each area or panel 29 includes three horizontal stripes. The top one 32, in the instance of each panel, is blue; the intermediate one 33 is red; and the bottom one 34 is black. Each of these stripes includes a numerical indication of the speed in revolutions per minute. The lever 17 may be moved so as to dispose its manipulating knob in front of any one of these panels with, of course, the exception of the central one which is disposed below.

When the upper lever or the range control lever 14 is disposed at, let us say, the slow speed, as indicated, the color blue being indicated, the blue stripe directly behind the knob of the speed lever 17 is read. It will be seen that the speed indicated is 23 R. P. M. If the upper lever should happen to be over the position marked intermediate, indicated at red, then the speed indicated by reading the red stripe would be 97 R. P. M. Likewise, if the lever 14 were over the fast range, the black stripe would be read and the speed would be 415 R. P. M. Thus, within the short swing of the lever 17, twenty-seven speeds may be indicated. It will be seen that the indication is quite graphic. Moreover, the two levers are disposed relatively close together, and the zone of operation is highly localized.

Having described my invention, I claim:

1. An indicator plate for indicating speed, comprising a plate having panels disposed horizontally across the top portion indicating speed ranges in color and words, and a series of panels arranged in rows vertically and horizontally, each of said panels including stripes corresponding in colors to the several colors of the range indicating panels, and numbers in each stripe indicating the revolutions per minute, said plate adapted to be mounted relative to levers, one of which operates horizontally relative to the range indicating panels and the other of which operates horizontally and vertically relative to the speed indicating panels and, whereby it is possible for the operator to determine the speed by the combined position of the levers relative to the panels.

2. An indicator plate for indicating speed, comprising a plate having panels disposed horizontally across the top portion indicating speed ranges in colors and words, and a series of panels arranged in rows vertically and horizontally, each of said panels including stripes corresponding in colors to the colors of the range-indicating panels, and numbers in each panel indicating the revolutions per minute, said plate adapted to be mounted relative to levers, one of which operates horizontally relative to the range-indicating panels and the other of which operates horizontally and vertically relative to the speed-indicating panels, whereby it is possible for the operator to determine the speed by the combined position of the levers relative to the panels.

3. An indicator plate for indicating speed, comprising a plate having panels disposed at the top portion for indicating speed ranges in colors, and a series of panels, each of said panels including portions corresponding in colors to the colors of the range-indicating panels, and numbers in each panel indicating the revolutions per minute, said plate adapted to be mounted relative to levers, one of which operates relative to the range-indicating panels and the other of which operates relative to the speed-indicating panels, whereby it is possible for the operator to determine the speed by the combined position of the levers relative to the panels.

4. Indicator means for a speed change transmission comprising, an indicator plate, a range control lever movable in a horizontal plane, said plate including indicia indicating range positions in color, said range control lever adapted to indicate range positions by virtue of the position of its manipulating end relative to said indicia, a speed control lever having a vertical and horizontal movement, and said plate including vertical and horizontal rows of panels having indicia indicating speeds, each panel including each color of the range positions and appropriate numerical indication of speed, said speed control lever adapted to indicate speed positions by virtue of the relation of its manipulating end relative to said panels and their respective colors, whereby the combined position of the two levers relative to the indicia indicates the speed.

5. Indicator means for a speed change transmission comprising, an indicator plate, said plate including indicia indicating range positions in color, a range control lever movable relative to said indicia for indicating the range position at which it is disposed, and said plate including panels having indicia indicating speeds, a speed control lever movable relative to said last-named indicia, each panel including each color of the range positions and appropriate numerical indication of speed, said speed control lever adapted to indicate the particular speed by virtue of the position at which it is disposed relative to the panels and their colors, whereby the combined position of the two levers relative to the indicia indicates the speed.

6. Indicator means for a speed change transmission, comprising an indicator plate, said plate including indicia indicating range positions and indicia indicating speed positions, said last-named indicia including panels each of which includes a series of speed indications, one for each range indicia, a range shift lever disposed adjacent the range indicia and adapted to indicate a particular range dependent upon its position, and a speed shifting lever disposed adjacent the speed indicia for indicating in combination with the range shifting lever and relative to the speed indicia a particular speed.

7. Indicator means for speed change transmission, comprising an indicator plate, said plate including differently colored panels including indicia indicating range positions and panels indicating speed positions, said last-named panels including sections, which sections are of different colors and of which there are a number corresponding to the number of range indicia, a range shift lever disposed adjacent the range indicia and adapted to indicate a particular range dependent upon its position, and a speed shifting lever disposed adjacent the speed indicia for indicating in combination with the range shifting lever and relative to the speed indicia a particular speed.

WILLIAM G. HOELSCHER.